(12) United States Patent
Jain et al.

(10) Patent No.: US 9,088,485 B2
(45) Date of Patent: Jul. 21, 2015

(54) SYSTEM, METHOD AND APPARATUS FOR SIGNALING AND RESPONDING TO ERO EXPANSION FAILURE IN INTER-DOMAIN TE LSP

(71) Applicants: Pradeep G Jain, Sunnyvale, CA (US); Kanwar D Singh, Mountain View, CA (US); Nisha Desai, Mountain View, CA (US); Srikrishnan Venkataraman, Mountain View, CA (US)

(72) Inventors: Pradeep G Jain, Sunnyvale, CA (US); Kanwar D Singh, Mountain View, CA (US); Nisha Desai, Mountain View, CA (US); Srikrishnan Venkataraman, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 160 days.

(21) Appl. No.: 13/722,642

(22) Filed: Dec. 20, 2012

(65) Prior Publication Data

US 2014/0029414 A1    Jan. 30, 2014

Related U.S. Application Data

(60) Provisional application No. 61/676,796, filed on Jul. 27, 2012.

(51) Int. Cl.
| | | |
|---|---|---|
| H04L 12/24 | (2006.01) | |
| H04L 12/803 | (2013.01) | |
| H04L 12/751 | (2013.01) | |
| H04L 12/707 | (2013.01) | |
| H04L 12/703 | (2013.01) | |
| H04L 12/913 | (2013.01) | |
| H04L 12/723 | (2013.01) | |

(52) U.S. Cl.
CPC ........ *H04L 41/0668* (2013.01); *H04L 41/0654* (2013.01); *H04L 41/0659* (2013.01); *H04L 41/0686* (2013.01); *H04L 45/026* (2013.01); *H04L 47/125* (2013.01); *H04L 45/22* (2013.01); *H04L 45/28* (2013.01); *H04L 45/50* (2013.01); *H04L 47/724* (2013.01)

(58) Field of Classification Search
None
See application file for complete search history.

(56) References Cited

U.S. PATENT DOCUMENTS

| | | |
|---|---|---|
| 7,602,702 B1 | 10/2009 | Aggarwal |
| 7,948,996 B2 | 5/2011 | Kompella |
| 8,014,275 B1 | 9/2011 | Sundt et al. |
| 8,243,587 B2 | 8/2012 | Darwish |
| 8,521,896 B2 | 8/2013 | Liu |
| 8,644,325 B2 | 2/2014 | Iovanna et al. |
| 8,693,339 B2 | 4/2014 | So |
| 8,797,886 B1 | 8/2014 | Kompella |
| 8,902,780 B1 | 12/2014 | Hegde et al. |
| 8,953,590 B1 | 2/2015 | Aggarwal et al. |

(Continued)

FOREIGN PATENT DOCUMENTS

WO    WO 2006/044217 A1    4/2006

OTHER PUBLICATIONS

International Search Report and Written Opinion for International Patent Application Serial No. PCT/US2013/051793, mailed Nov. 27, 2013, consists of 8 unnumbered pages.

(Continued)

*Primary Examiner* — Diane Lo
(74) *Attorney, Agent, or Firm* — Wall & Tong, LLP

(57) ABSTRACT

A system, method and apparatus for performing a constraint base shortest path computation (CSPF) in a manner excluding those nodes indicated as having failed an ERO expansion, the indication being provided via an error code within an RSVP path message associated with setup of an alternate LSP.

23 Claims, 3 Drawing Sheets

(56) References Cited

U.S. PATENT DOCUMENTS

| | | | |
|---|---|---|---|
| 2006/0092952 A1* | 5/2006 | Boutros et al. | 370/400 |
| 2006/0140111 A1 | 6/2006 | Vasseur et al. | |
| 2006/0209716 A1* | 9/2006 | Previdi et al. | 370/254 |
| 2007/0047469 A1* | 3/2007 | Vasseur et al. | 370/255 |
| 2007/0070914 A1 | 3/2007 | Abigail | |
| 2007/0124453 A1 | 5/2007 | Slaughter et al. | |
| 2008/0069007 A1 | 3/2008 | Vasseur et al. | |
| 2008/0198751 A1 | 8/2008 | Li | |
| 2009/0010153 A1 | 1/2009 | Filsfils et al. | |
| 2009/0046723 A1 | 2/2009 | Rahman et al. | |
| 2009/0135841 A1 | 5/2009 | Vasseur et al. | |
| 2009/0207845 A1 | 8/2009 | Guan | |
| 2010/0142531 A1 | 6/2010 | Kansara et al. | |
| 2010/0169506 A1 | 7/2010 | Krzanowski et al. | |
| 2010/0208741 A1 | 8/2010 | Vasseur | |
| 2011/0090786 A1 | 4/2011 | Liu et al. | |
| 2012/0027013 A1 | 2/2012 | Napierala | |
| 2013/0232193 A1* | 9/2013 | Ali et al. | 709/203 |

OTHER PUBLICATIONS

Aggarwal R., et al., "Extensions to Resource Reservation Protocol—Traffic Engineering (RSVP-TE) for Point-to-Multipoint TE Label Switched Paths (LSPs); rfc4875.txt," May 1, 2005, XP015052419.

Pan P., et al., "Fast Reroute Extensions to RSVP-YE for LSP Tunnels; rfc4090.txt," May 1, 2005, XP015041909.

International Search Report and Written Opinion for International Application No. PCT/US2013/051697, mailed Nov. 7, 2013, Alcatel-Lucent USA Inc., Applicant, 8 pages.

Cristel Pelsser et al: "Path Selection Techniques to Establish Constrained Interdomain MPLS LPs", Jan. 1, 2006, Networking 2006. Networking Technologies, Services, and Protocols; Performance of Computer and Communication Networks; Mobile and Wireless Communications Systems Lecture Notes in Computer Science; LNCS, Springer, Berlin, DE, pp. 209-220, XP019030828, ISBN: 978-3-540-34192-5, pp. 209-220.

International Search Report and Written Opinion for International Application Serial No. PCT/US2013/050510, dated Oct. 29, 2013, consists of 8 unnumbered pages.

International Search Report and Written Opinion for International Application No. PCT/US2013/050536, mailed Nov. 13, 2013, Alcatel-Lucent USA Inc., Applicant, 8 pages.

Katz D Ward Juniper Networks D: "Bidirectional Forwarding Detection (BFD); rfc5880.txt", Bidirectional Forwarding Detection (BFD); RFC5880.txt, Internet Engineering Task Force, IETF; Standard, Internet Society (ISOC) 4, Rue des Falaises CH-1205 Geneva, Switzerland, Jun. 1, 2010, pp. 1-49, XP015070820, [retrieved on 96/01/2010].

RFC 5880—"Biodiectional Forwarding Detection", Juniper Networks, ISSN: 2070-1721, Jun. 2010, pp. 1-49.

* cited by examiner

200  FIG. 2

SYSTEM, METHOD AND APPARATUS FOR SIGNALING AND RESPONDING TO ERO EXPANSION FAILURE IN INTER-DOMAIN TE LSP

CROSS-REFERENCE TO RELATED APPLICATION

This application claims the benefit of U.S. Provisional Patent Application Ser. No. 61/676,796, filed Jul. 27, 2012, entitled SYSTEM, METHOD AND APPARATUS FOR IMPROVED MPLS MANAGEMENT, which application is incorporated herein by reference in its entirety.

FIELD OF THE INVENTION

The invention relates to the field of communication networks such as multi-protocol label switching (MPLS) networks and, more particularly but not exclusively, to enhanced LSP signaling mechanisms.

BACKGROUND

Multiprotocol Label Switching (MPLS) enables efficient delivery of a wide variety of differentiated, end-to-end services. Multiprotocol Label Switching (MPLS) traffic engineering (TE) provides a mechanism for selecting efficient paths across an MPLS network based on bandwidth considerations and administrative rules. Each label switching router maintains a TE link state database with a current network topology. Once a path is computed, TE is used to maintain a forwarding state along that path.

As described in more detail in various Internet Engineering Task Force (IETF) Request for Comment (RFC), such as RFC4726 and RFC5151, an Area Border Router (ABR) is a router located between several areas in a hierarchical Open Shortest Path First (OSPF) network. ABRs maintain topology information from multiple areas. In the case of Resource Reservation Protocol (RSVP) Inter-Domain TE-LSPs of type Contiguous LSP each Area Border Router (ABR) triggers a path computation (also referred to as an ERO expansion), before forwarding the RSVP Path message downstream. Thus, each ABR is responsible for calculating TE constrained path for its successive TE-Domain(s) or Area(s). Every such ABR that triggers path a computation for its TE-Domain can have multiple equal-cost paths and has to choose one of them.

In the case of a LSP setup spanning multiple TE domains or areas, it is possible for an ingress Label Edge Routers (LER) or subsequent ABR node doing an ERO expansion to have available to it multiple un-equal cost paths to reach a next ABR or a destination of the LSP. If a given node fails ERO expansion and the node happens to be associated with the best path to reach the destination, the LSP setup may fail until the network re-converges, which may not happen for an extended period of time. Further, this LSP setup failure may occur even though an alternate path exists since the LSP setup process may never use the alternate path if it is deemed to be non-optimal.

SUMMARY

Various deficiencies in the prior art are addressed by systems, methods and apparatus for performing a constraint base shortest path computation (CSPF) in a manner excluding those nodes indicated as having failed an ERO expansion, the indication being provided via an error code within an RSVP path message associated with setup of an alternate LSP.

Generally speaking, the operation of Area Border Routers (ABRs) in a network is adapted to indicate that a failed ERO expansion has occurred, thereby enabling an ingress LER to provide an alternate LSP avoiding the failed ABR.

A method according to one embodiment is suitable for use within a network supporting Resource Reservation Protocol (RSVP) Inter-Domain Traffic Engineering Label Switched Paths (TE-LSPs), the method comprising performing a constraint base shortest path computation (CSPF) in a manner excluding those nodes indicated as having failed an ERO expansion, said indication being provided via an error code within an RSVP path message associated with setup of an alternate LSP.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be described within the context of a network supporting Resource Reservation Protocol (RSVP) Inter-Domain Traffic Engineering Label Switched Paths (TE-LSPs) of type Contiguous LSP, such as defined in IETF RFC4726 and RFC5151, each of which is incorporated by reference in its respective entirety.

Figure 1:
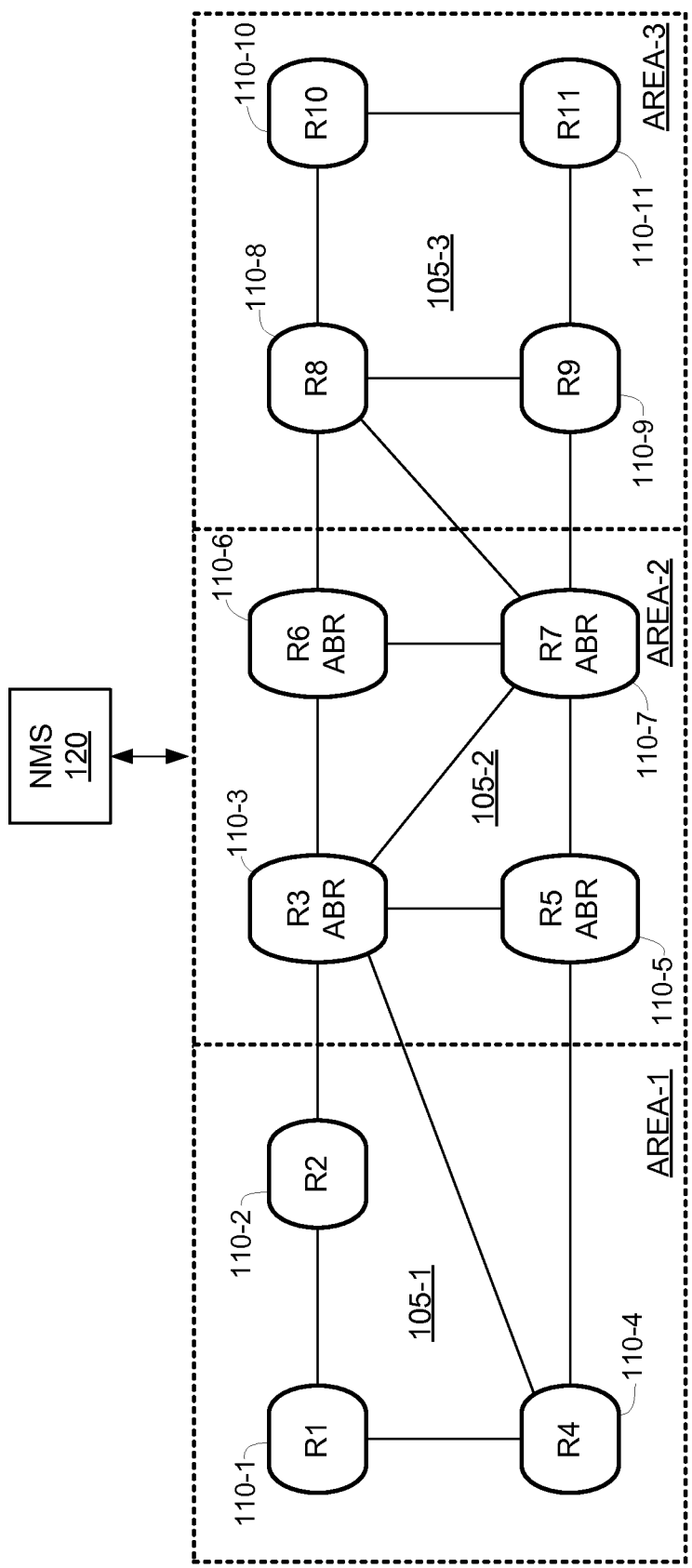
FIG. 1 depicts an exemplary network benefiting from the various embodiments.

FIG. 1 depicts a high-level block diagram of a communication network benefiting from various embodiments. Specifically, the network 100 of FIG. 1 provides a Multi-Protocol Label Switching (MPLS) network supporting Resource Reservation Protocol (RSVP) Inter-Domain Traffic Engineering Label Switched Paths (TE-LSPs) of type Contiguous LSP. The network may be modified by those skilled in the art to use other MPLS related protocols rather that the exemplary protocol discussed herein.

The network 100 includes three IP/MPLS communication networks (CN) 105-1, 105-2 and 105-3, where each communication network 105 is associated with a respective area. The network 100 also includes at least one network management system (NMS) 120. As depicted, NMS 120 is operative to control a plurality of routers 110-1 through 110-11 distributed among the communication network areas 105-1 through 105-3.

First area 105-1 comprises the first 110-1, second 110-2 and fourth 110-4 routers, second area 105-2 comprises the third 110-3, fifth 110-5, sixth 110-6 and seventh 110-7 routers, while third area 105-3 comprises the eighth 110-8, ninth 110-9, tenth 110-10 and eleventh 110-11 routers. It is noted that various routers are interconnected to form thereby paths. Specifically, the following sequence of router connections is depicted in FIG. 1, where adjacent named routers are connected or linked to each other: R1-R2-R3-R6-R8-R10-R11-R9-R7-R5-R4-R1. In addition, R3 is connected/linked to each of R4, R5 and R7, while R7 is additionally connected/linked to R8.

The third 110-3 (R3) and fifth 110-5 (R5) routers operate as Area Border Routers (ABRs) separating the first 105-1 and second 105-2 areas. Similarly the sixth 110-6 (R6) and seventh 110-7 (R7) routers operate as ABRs separating the second 105-2 and third 105-3 areas.

Data packets or datagrams are routed according to ingress and egress virtual connection (VC) labels on a per-service basis. The VC labels are used by the PE routers 130 for demultiplexing traffic arriving from different services over the same set of LSP tunnels.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 3.

The NMS 120 and the various routers 110 operate to support Resource Reservation Protocol (RSVP) Inter-Domain Traffic Engineering Label Switched Paths (TE-LSPs) of type Contiguous LSP.

As previously noted, each of the ABRs depicted in the network 105 of FIG. 1 (e.g., routers R3, R6, R5 and R7) receives an RSVP path message and performs a path computation (also referred to as an ERO expansion) before forwarding the RSVP Path message toward a next router downstream.

LSP setup cost constraints and other parameters of the LSP to be set up are typically defined at the Ingress Label Edge Router (LER) associated with the desired LSP. Various parameters are used depending on, for example, the particular routing protocol used, such Open Shortest Path First (OSPF) or Intermediate System-to-Intermediate System (IS-IS) adaptive routing protocols.

In the case of a LSP setup spanning multiple TE domains or areas, it is possible for an ingress Label Edge Routers (LER) or a subsequent ABR node doing an ERO expansion to have available to it multiple un-equal cost paths to reach a next ABR or a destination of the LSP. However, if a given node fails ERO expansion and the node happens to be associated with the best path to reach the destination, the LSP setup may fail until the network re-converges, which may not happen for an extended period of time. Further, this LSP setup failure may occur even though an alternate path exists since the LSP setup process may never use the alternate path if it is deemed to be non-optimal.

Receiver hosts send RSVP reservation requests (Resv) messages upstream towards the senders to create and maintain "reservation state" in each node along the path(s). RSVP sender hosts transmit RSVP Path messages downstream along unicast/multicast routes provided by the routing protocol(s), following the paths of the data. These Path messages store "path state" in each node along the way, including at least the unicast IP address of the previous hop node, which is used to route RSVP Resv messages hop-by-hop in the reverse direction.

In various embodiments, a node that fails ERO expansion indicates to the ingress LER through a RSVP Path error message with error code that ERO expansion failed. Optionally, in various embodiments, the same mechanism may be used by a node that failed ERO expansion to indicate to the ingress LER the conditions associated with the failed ERO expansion have changed and that an ERO expansion would not be successful.

In response to an indication of ERO expansion failure, the ingress LER node can then put the node that responded with the path Error in its XRO sub-object in the subsequent path after performing an new Constrained Shortest Path First (CSPF) calculation. This helps in setting up the LSP through an alternate sub-optimal path in case the optimal path of the network is not able to satisfy the constraints of the LSP. Once the optimal path is able to support the required constraints on the LSP, the LSP is re-optimized to use the optimal path.

Thus, various embodiments utilize a RSVP path message modified to include additional information adapted to communicate to ABRs that one or more ABR's or nodes should be excluded from any ERO expansion. In this manner, failed ABRs or nodes in an XRO object or EXRS, an ABR node performing an ERO expansion outside of the TE domain of the ingress LER will know to exclude the failed ABR or node when performing its own ERO expansion. In this manner, the creation of an alternate LSP may be quickly triggered in response to a failed ERO expansion in a TE domain outside of the TE domain of the ingress LER.

In various embodiments, downstream RSVP path messages are modified to include error information to indicate that a ABR or node has failed (or recovered/restored) such that a failed ABR node is not used within the context of a path calculation.

In various embodiments, a newly defined RSVP Path error message includes information to indicate that an ERO expansion failure has occurred and to indicate the ABR or node associated with that failure.

The RSVP-TE specification [RFC3209] and GMPLS extensions [RFC3473] allow abstract nodes or resources to be explicitly included in a path setup using the Explicit Route Object (ERO), and explicitly excluded in a path setup using the eXclude Route Object (XRO) and/or the Explicit Exclusion Route Subobject (EXRS).

Figure 2:
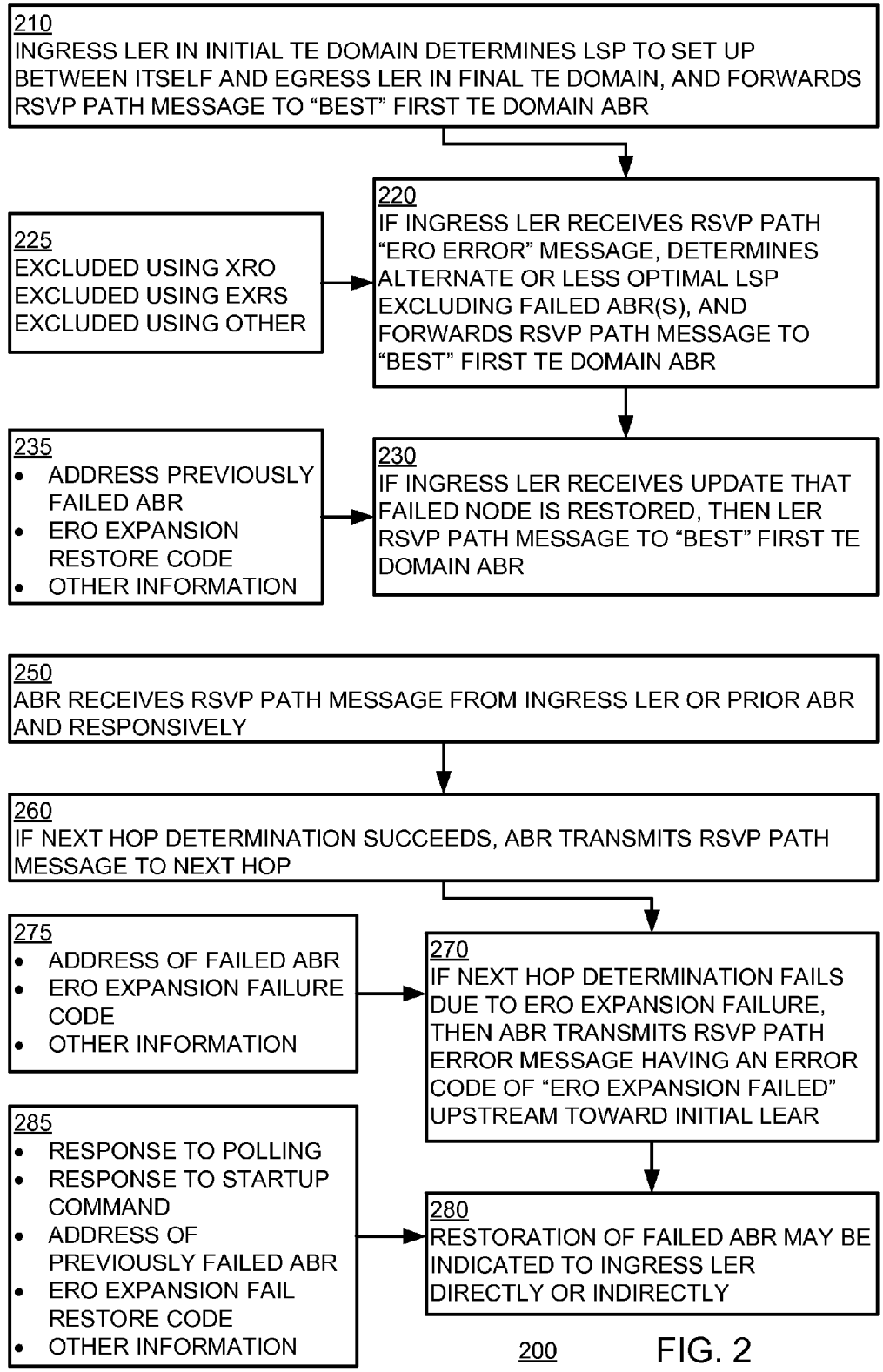
FIG. 2 depicts a flow diagram of a method according to one embodiment.

FIG. 2 depicts a flow diagram of a method according to one embodiment. Specifically, FIG. 2 depicts a method 200 for adapting label switched path (LSP) setup in response to Explicit Route Object (ERO) expansion failure in inter-domain TE LSP.

Generally speaking, in response to a ERO expansion failure associated with a low-cost (optimal) path associated with one or more ABR nodes, a feedback mechanism is employed to indicate such failure to an ingress LER so that the ingress LER may set up an alternate or higher cost (suboptimal) LSP via, illustratively, identifying failed modes using eXcluded Route Object (X) and/or Explicit Exclusion Route Subobject (EXRS). Similarly, the feedback mechanism is also employed to indicate that the ERO expansion failure has been corrected (e.g., an unreachable node can now be reach) such that the ingress LER may set up the initial low-cost (optimal) path or at least path more optimal than the present LSP.

The method of FIG. 2 contemplates steps performed by an ingress LER (steps 210-235) as well as steps performed by one or more ADRs (steps 240-285).

Ingress LER Operation

At step 210, an ingress LER in an initial TE domain or area determines that an LSP needs to be set up between itself and an egress LER in a final (e.g., second, third, fourth etc.) TE domain or area, establishes cost constraint and other LSP parameters, determines the "best" first TE domain ABR to reach that egress LER, and forwards an RSVP path message to the best initial TE domain ABR. The RSVP Path message is forwarded to the ABR by the ingress LER following a path specified in an ERO object.

At step 220, if the ingress LER receives a message indicative of a failed ERO expansion (e.g., an RSVP Path Error Message having an error code of "ERO expansion failed" such as generated by an ABR as described below with respect to step 270), then the ingress LER determines that an alternate or less optimal LSP needs to be set up in which the ABR associated with the failed ERO expansion is excluded. Referring to box 225, the failed ABR (and, optionally, other nodes or network elements as indicated by the ERO error message) is excluded from the alternate or less optimal LSP path setup using XRO functionality, EXRS functionality or some other mechanism. For example, the RSVP path message for the new LSP may carry the information/address of ABR or node that generated the ERO expansion failure error within an error sub-code sub code as "Ero expansion failed" in a XRO object.

By including the failed ABR or node in an XRO object or EXRS, an ABR node performing an ERO expansion outside of the TE domain of the ingress LER will know to exclude the failed ABR or node when performing its own ERO expansion. In this manner, the creation of an alternate LSP may be quickly triggered in response to a failed ERO expansion in a TE domain outside of the TE domain of the ingress LER.

Once the low cost path reconverges or has resources to satisfy the constraints of the preferred or optimal LSP, the ingress LER may decide to re-optimize the LSP path using the optimal path using the low cost path towards the destination. This may occur when the cause of the failure no longer exists (e.g., a failed link, network element, control path and the like is repaired/removed). In this situation, the removal of the cause of the failure may be reported back to the ingress LER via a RSVP Path "ERO restored" message, as described herein.

At step 230, if the ingress LER becomes aware of a restored ABR via some mechanism (e.g., a restoration indicative mechanism such as an IGP mechanism, timer-based mechanism, request for operator intervention or message from the restored ABR, then the ingress LER may determine that the original or at least a more optimal (with respect to the presently set up LSP) alternate LSP may be set up in which the ABR associated with the restored ERO expansion is included.

Steps 220-235 may be continually repeated by the ingress LER such that multiple or "nested" LSP's may be set up in response to multiple ABR ERO expansion failures. As each ABR ERO expansion failure occurs, a new and less optimal LSP is set up. As each ABR ERO expansion restoration occurs, a new and more optimal LSP is set up if possible (i.e., the now-usable ABR forms part of more optimal LSP is print.

ABR Operation

At step 250, an ABR receives an RSVP path message (e.g., from the ingress LER or another ABR) and responsively determines a next hop. If the next hop from the ABR comprises a loose hop (i.e., a hop to a router not directly connected to the ABR) then a lowest-cost path calculation or ERO expansion operation is performed in accordance with the LSP cost constraints indicated within the RSVP path message. It is noted that if the next hop from the ABR comprises a strict hop (i.e., a hop to a router directly connected to the ABR) then a lowest-cost path calculation is not necessary.

At step 260, if the next hop determination succeeds then the ABR generates and transmits for the next hop and RSVP path message.

At step 270, if the next hop determination fails due to a failure of an ERO expansion operation, then the ABR generates and transmits toward the initial LER an ERO failure indicative message, such as a RSVP Path error message having an error code of "ERO expansion failed". Referring to box 275, the "ERO expansion failed" message includes the ABR address and an error code indicating that the ERO expansion failed. Other information may also be included, such as details pertaining to the ERO failure, unreachable critical node or network element information and the like.

At step 280, a restoration of a failed ABR or may be indicated to the ingress LER either directly or indirectly. Specifically, when a failed ABR is restored, it may again be used by the ingress LER as part of an LSP. Where a restored ABR was a preferred ABR, the LSP formed by the ingress LER may be improved by migrating the LSP to the now restored ABR. In general, the ingress LER learns of the restoration of the failed ABR via IGP Convergence or other known mechanisms. Upon learning of such restoration, the ingress LER may choose to re-signal the optimal LSP using the now recovered or restored ABR.

In some embodiments, the now restored ABR provides an indication to the ingress LER that restoration has occurred. Referring to box 285, this indication may be provided in response to polling of the failed ABR by the ingress LER, a startup command associated with the ABR executed upon its restoration, or some other mechanism. Thus, in response to a service restoration sufficient to enable a successful ERO expansion at a previously failed ABR, a restoration mechanism is invoked by the ingress LER to reroute the LSP. This restoration mechanism may comprise an IGP mechanism, timer-based mechanism or a request for operator intervention.

For example, in one embodiment if a next hop determination by the restored ABR using the original RSVP path message is or would now be successful (e.g., a message indicating restoration of a path critical node or network element has been received by the ABR), then the restored ABR generates and transmits toward the initial LER an indication of such restoration, such as a RSVP Path error message having an error code of "ERO restored". Referring to box 285, an "ERO restored" or other message may include the address of the previously failed ABR as well as an error code indicating that the previously failed ERO expansion may now be performed successfully. Other information may also be included, such as details pertaining to the ERO failure restoration, now-reachable critical note or network element information and the like Steps 250-285 may be used for some or all of the ABRs in an LSP.

Example

Referring to FIG. 1, assume that R1 needs to setup an LSP from R1 to R11. The path of an Inter-Domain TE LSP T1 from R1 (head-end LSR) to R11 (tail-end LSR) is defined on R1 as the following loosely routed path: R1-R3(loose)-R8(loose)-R11(loose).

After establishing the LSP cost constraint mechanism and various other constraints, R1 determines that the next hop (R3) is a loose hop (not directly connected to R1) and then performs an ERO expansion operation to reach the next loose hop R3. The new ERO could become: R2(S)-R3(S)-R8(L)-

R11(L) or R4(S)-R3(S)-R8(L)-R11(L), where S is a strict hop (L=0) and L is a loose hop (L=1). Both the paths R1-R2-R3 and R1-R4-R3 are equal-cost paths and satisfy T1's set of constraints. Based on the configuration the IGP cost or TE-Metric cost is used to select one of these two paths, as defined by the established LSP cost constraint mechanism. R1 forwards towards R3 an RSVP path message following the path specified in the ERO object with the following content: R8(L)-R11(L).

R3 receives the RSVP path message and determines that the next hop (R8) is a loose hop (not directly connected to R3) and then performs an ERO expansion operation to reach the next loose hop R8. Assume that the ERO could become: R6(S)-R8(S)-R11(L) or R7(S)-R8(S)-R11(L), and that based on the LSP cost criteria that path R6-R8-11 is a lower-cost path than path R7-R8-R11. R3 forwards towards R8 an RSVP path message following the path specified in the ERO object with the following content: R11(L).

R8 receives the RSVP path message and determines that the next hop (R11) is a loose hop (not directly connected to R8) and then performs an ERO expansion operation to reach the next loose hop R11. Assume that the ERO expansion operation fails due to, for example, a lack of reachability from R8 of R9 or R10, either of which would connect R8 to R11.

In response to the failure, R8 sends an RSVP Path error "ERO failure" message back upstream toward R1 in which R8 identified as a failed ABR.

In response to the "ERO failure" message identifying R8, R1 determines that an alternate LSP needs to be set up by a path not including R8. Specifically, the alternate path of an Inter-Domain TE LSP T1 from R1 (head-end LSR) to R11 (tail-end LSR) is defined on R1 as the following loosely routed path: R1-R3(loose)-R7-R9-R11. R1 forwards towards R3 an RSVP path message following the path specified in the ERO object with the following content: R7-R9-R11. Assume that the remaining hops are process without error.

In this manner, an alternate LSP having higher cost than the initially determined LSP is set up. When R8 indicates that the failure associated with its ERO expansion operation no longer exists, it may propagate a RSVP Path "ERO restored" message back to R1. R1 may, if appropriate, reoptimize the LSP to include R8 and whatever other nodes are part of an optimal or lowest-cost path.

Figure 3:
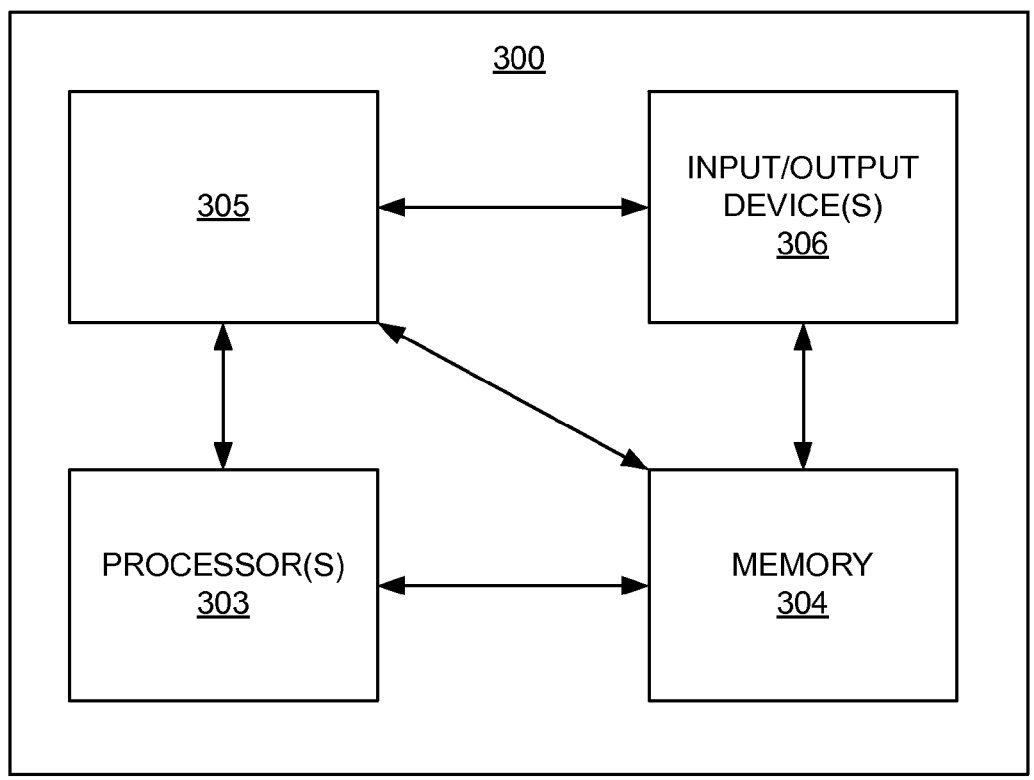
FIG. 3 depicts a high-level block diagram of a computer suitable for use in performing functions described herein.

FIG. 3 depicts a high-level block diagram of a computer suitable for use in performing functions described herein. As depicted in FIG. 3, computer 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., RAM memory, magnetic or optical drive or diskette, and the like.

It will be appreciated that computer 300 depicted in FIG. 3 provides a general architecture and functionality suitable for implementing functional elements described herein or portions network of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims.

What is claimed is:

1. In a network supporting Resource Reservation Protocol (RSVP) Inter-Domain Traffic Engineering Label Switched Paths (TE-LSPs), a method comprising:
performing, by a router in a first area, a constrained shortest path first (CSPF) computation associated with a Label Switched Path (LSP) to be terminated at an egress label edge router (LER) in a second area;
said CSPF computation excluding those nodes indicated as having failed an explicit route object (ERO) expansion at an area border router (ABR) between said first and second areas, said indication being provided via an error code within an RSVP path message associated with setup of an alternate LSP, said error code identifying the ABR associated with the failed ERO expansion in an excluded route object (XRO) object associated with said alternate LSP.

2. The method of claim 1, wherein the ABR associated with a failed ERO expansion is adapted to generate an RSVP Path error message identifying the ABR.

3. The method of claim 2, wherein the RSVP Path error message identifies one or more failed nodes upstream from the ABR associated with the failed ERO expansion.

4. The method of claim 2, wherein in response to a service restoration sufficient to enable a successful ERO expansion at the ABR associated with the failed ERO expansion, a restoration mechanism is invoked to reroute the LSP.

5. The method of claim 4, wherein said RSVP Path message is indicative of the service restoration being adapted to trigger LSP setup of a lower-cost LSP.

6. The method of claim 4, wherein the restoration mechanism comprises a timer based mechanism.

7. The method of claim 4, wherein the restoration mechanism comprises a request for operator intervention.

8. The method of claim 4, wherein the restoration mechanism comprises an IGP mechanism.

9. The method of claim 2, wherein each ABR associated with a failed ERO expansion is adapted to forward a respective RSVP Path error message identifying the ABR towards an ingress Label Edge Router (LER).

10. The method of claim 9, wherein the ingress LER is adapted to set up an increased cost LSP in response to receiving a RSVP Path error message identifying an ABR associated with a failed ERO expansion.

11. The method of claim 9, wherein the ingress LER is adapted to set up a reduced cost LSP in response to receiving a RSVP Path message identifying an ABR associated with a restored ERO expansion.

12. The method of claim 1, wherein said XRO object associated with said alternate LSP is adapted to cause subsequent ABRs of said alternate LSP to avoid using said failed ABR in respective CSPF computations.

13. The method of claim 1, further comprising:
including information identifying each of at least one ABR associated with a respective failed ERO expansion in an excluded route object (XRO) object associated with said alternate LSP.

14. The method of claim 1, further comprising:
receiving from an ABR associated with a failed ERO expansion an update message indicating that the ABR is restored; and
restoring the initially performed CSPF downstream through the restored ABR.

15. The method of claim 1, wherein said router in said first area comprises an ingress LER.

16. The method of claim 1, wherein said router in said first area comprises an ABR bordering said first area and a subsequent area, said method further comprising:
in the event of a successful ERO expansion by said router in said first area, forwarding by said router in said first area a corresponding LSP downstream RSVP path message.

17. The method of claim 16, further comprising:
in the event of an unsuccessful ERO expansion by said router in said first area, forwarding by said router in said first area a corresponding LSP upstream error message.

18. The method of claim 17, further comprising:
in the event of said unsuccessful ERO expansion by said router in said first area becoming successful, forwarding by said router in said first area a corresponding LSP upstream restoration message.

19. The method of claim 1, wherein said method is performed at each of a plurality of ABRs associated with said LSP.

20. A method, comprising:
propagating toward an ingress Label Edge Router (LER) in a first area an error message indicative of a failed explicit route object (ERO) expansion at an Area Border Router (ABR) associated with a second area, said error message being adapted to cause said ingress LER to set up an alternate LSP excluding the ABR associated with the failed ERO expansion and to identify the ABR associated with the failed ERO expansion in an excluded route object (XRO) object associated with said alternate LSP.

21. An apparatus, comprising a processor configured for:
performing, by a router in a first area, a constrained shortest path first (CSPF) computation associated with a Label Switched Path (LSP) to be terminated at an egress label edge router (LER) in a second area;
said CSPF computation excluding those nodes indicated as having failed an explicit route object (ERO) expansion at an area border router (ABR) between said first and second areas, said indication being provided via an error code within an RSVP path message associated with setup of an alternate LSP, said error code identifying the ABR associated with the failed ERO expansion in an excluded route object (XRO) object associated with said alternate LSP.

22. A non-transitory computer readable storage medium storing instructions which, when executed by a computer, cause the computer to implement a method, comprising:
performing, by a router in a first area, a constrained shortest path first (CSPF) computation associated with a Label Switched Path (LSP) to be terminated at an egress label edge router (LER) in a second area;
said CSPF computation excluding those nodes indicated as having failed an explicit route object (ERO) expansion at an area border router (ABR) between said first and second areas, said indication being provided via an error code within an RSVP path message associated with setup of an alternate LSP, said error code identifying the ABR associated with the failed ERO expansion in an excluded route object (XRO) object associated with said alternate LSP.

23. A non-transitory computer program product wherein computer instructions, when processed by a computer, adapt the operation of the computer to implement a method, comprising:
performing, by a router in a first area, a constrained shortest path first (CSPF) computation associated with a Label Switched Path (LSP) to be terminated at an egress label edge router (LER) in a second area;
said CSPF computation excluding those nodes indicated as having failed an explicit route object (ERO) expansion at an area border router (ABR) between said first and second areas, said indication being provided via an error code within an RSVP path message associated with setup of an alternate LSP, said error code identifying the ABR associated with the failed ERO expansion in an excluded router object (XRO) object associated with said alternate LSP.

* * * * *